(12) United States Patent
Higgins et al.

(10) Patent No.: US 7,404,940 B2
(45) Date of Patent: Jul. 29, 2008

(54) METHOD FOR FLUE-GAS REDUCTION OF POLLUTANTS IN COMBUSTION PROCESSES

(75) Inventors: Brian S. Higgins, Walnut Cove, CA (US); Mark Shilling, Apex, NC (US); Edwin Haddad, Palm Beach Gardens, FL (US)

(73) Assignee: Mobotec USA, Inc., Walnut Creek, CA (US)

( * ) Notice: Subject to any disclaimer, the term of this patent is extended or adjusted under 35 U.S.C. 154(b) by 0 days.

(21) Appl. No.: 11/520,083

(22) Filed: Sep. 13, 2006

(65) Prior Publication Data

US 2007/0009413 A1   Jan. 11, 2007

(51) Int. Cl.
*B01D 53/34* (2006.01)
*B01D 53/50* (2006.01)
*B01D 53/56* (2006.01)

(52) U.S. Cl. .................. 423/210; 423/235; 423/242.1; 423/244.01; 423/244.07; 423/244.08; 423/239.1

(58) Field of Classification Search ............ 423/210, 423/235, 242.1, 243.03, 244.01, 244.07, 423/244.08, 240 S, 239.1, 215.5
See application file for complete search history.

(56) References Cited

U.S. PATENT DOCUMENTS

| | | | | |
|---|---|---|---|---|
| 5,089,910 | A | 2/1992 | Sigler | 110/235 |
| 5,809,910 | A * | 9/1998 | Svendssen | 110/235 |
| 2004/0185399 | A1 | 9/2004 | Moberg | 431/4 |
| 2004/0185401 | A1 | 9/2004 | Moberg | 431/9 |
| 2004/0185402 | A1 | 9/2004 | Moberg | 431/9 |
| 2004/0253161 | A1 | 12/2004 | Higgins | 423/235 |
| 2005/0002841 | A1 | 1/2005 | Moberg | 423/235 |
| 2005/0013755 | A1 | 1/2005 | Higgins | 423/235 |

OTHER PUBLICATIONS

Edwin Haddad, et al. Full-Scale Evaluation of a Multi-Pollutant Reduction Technology: SO2,Hg, and NOx, Combined Power Plant Air Pollutant Control Mega Symposium, May 19, 2003.
Mobotec USA Sales Brochure, "NOx SO2 Hg Combustion Improvement: Multi-Pollutant Rreduction Technology: Improved boiler combustion for cost-effective proven results," dated 2002, downloaded by examiner from http://www.mobotecusa.com/literature/general_brochure.pdf on Mar. 3, 2006.

* cited by examiner

*Primary Examiner*—Timothy C Vanoy
(74) *Attorney, Agent, or Firm*—MacCord Mason PLLC

(57) ABSTRACT

Systems and methods for reduction of pollutants in combustion processes using combined rotating opposed fired air (ROFA) and fuel injection sorbents (FSI) for increased chemical reactivity.

25 Claims, 2 Drawing Sheets

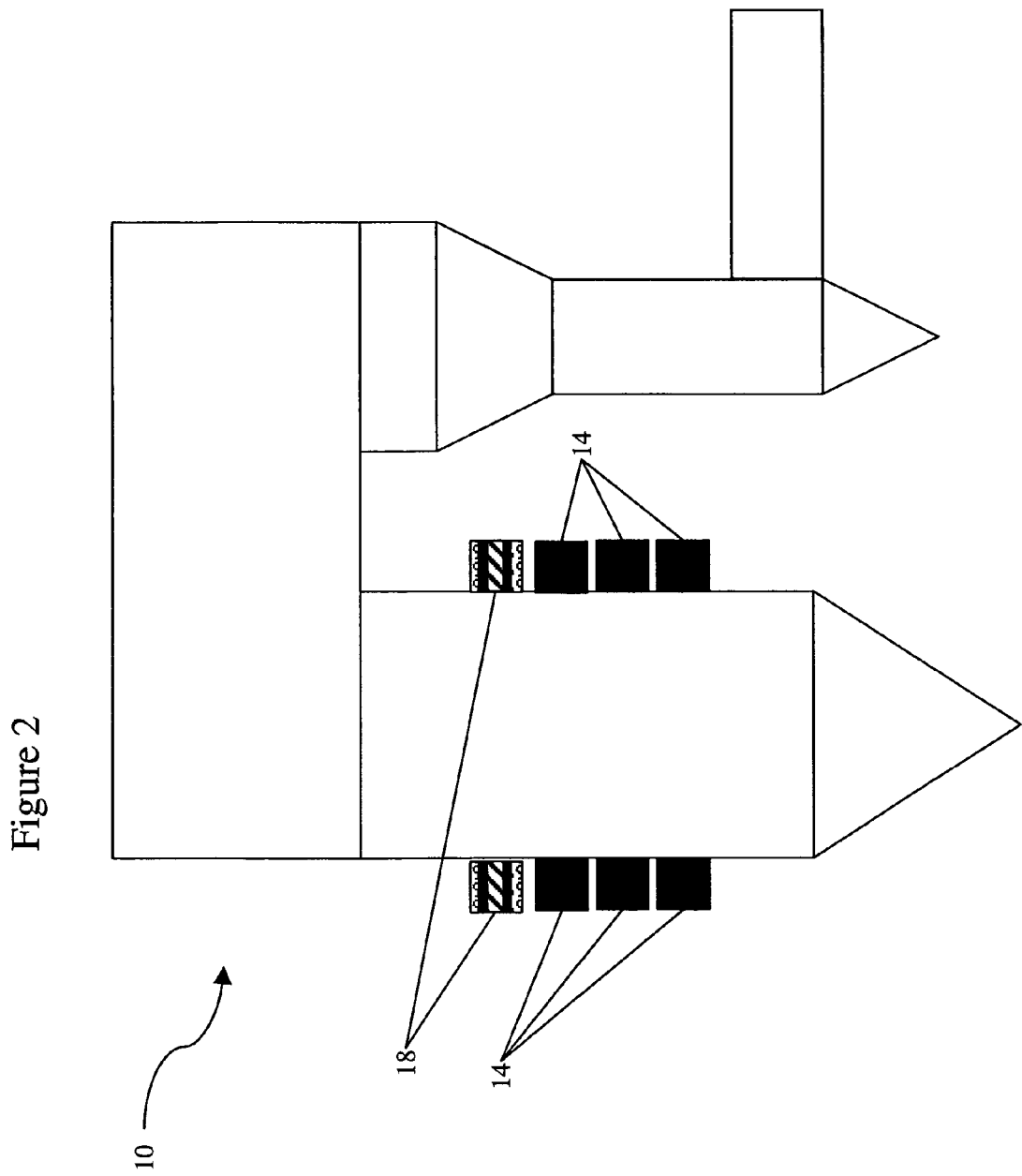

METHOD FOR FLUE-GAS REDUCTION OF POLLUTANTS IN COMBUSTION PROCESSES

BACKGROUND OF THE INVENTION

1. Field of the Invention

The present invention relates generally to a method for reducing byproducts emissions from combustion reactions, and, more particularly, to a method for regulating flue gas pollutants in reactors and combustion furnaces.

2. Description of the Prior Art

The combustion of sulfur-containing carbonaceous compounds, especially coal, results in a combustion product gas containing unacceptably high levels of sulfur dioxide.

$SO_2$ Reduction Methods

The reduction of sulfur dioxide ($SO_2$) is of primary concern to the power and industrial boiler industries since acid rain is a product of gaseous $SO_2$ release into the environment. To combat acid rain, federal regulations are increasingly more stringent and companies are increasingly more exposed to federal penalties for over emitting $SO_2$.

Sulfur dioxide is a colorless gas that is moderately soluble in water and aqueous liquids. It is formed primarily during the combustion of sulfur-containing fuel or waste. Once released to the atmosphere, sulfur dioxide reacts slowly to form sulfuric acid ($H_2SO_4$), inorganic sulfate compounds, and organic sulfate compounds.

Air pollution control systems for sulfur dioxide removal are large and sophisticated, and rely on two main techniques for sulfur dioxide removal: absorption and adsorption. Both methods rely on neutralization of the absorbed sulfur dioxide to an inorganic salt by alkali to prevent the sulfur from being emitted into the environment. The alkali for the reaction most frequently used include: limestone—either calcitic or dolomitic; quick and hydrated lime—slurry or dry; and magnesium hydroxide—commercial and byproduct from Thiosorbic lime; and trona.

Absorption—Absorption processes use the solubility of sulfur dioxide in aqueous solutions to remove it from the gas stream. Once sulfur dioxide has dissolved in solution to form sulfurous acid ($H_2SO_3$), it reacts with oxidizers to form inorganic sulfites ($SO3^-$) and sulfates ($SO4^-$). This process prevents the dissolved sulfur dioxide from diffusing out of solution and being re-emitted. The solution is then processed to remove the sulfur Limestone is the alkali most often used to react with the dissolved sulfur dioxide. Limestone slurry is sprayed into the sulfur dioxide-containing gas stream. The chemical reactions in the recirculating limestone slurry and reaction products must be carefully controlled in order to maintain the desired sulfur dioxide removal efficiency and to prevent operating problems. Wet scrubbers used for sulfur dioxide control usually operate at liquid pH levels between 5 to 9 to maintain high efficiency removal. Typical removal efficiencies of sulfur dioxide in wet scrubbers range from 80 to 95%.

Another type of absorption system is called a spray atomizer dry scrubber, which belongs to a group of scrubbers called spray-dryer-type dry scrubbers. In this case, an alkaline slurry is sprayed into the hot gas stream at a point upstream from the particulate control device. As the slurry droplets are evaporating, sulfur dioxide absorbs into the droplet and reacts with the dissolved and suspended alkaline material.

Large spray dryer chambers are used to ensure that all of the slurry droplets evaporate to dryness prior to going to a high efficiency particulate control system. The term "dry scrubber" refers to the condition of the dried particles approaching the particulate control system. Fabric filters or electrostatic precipitators are often used for high efficiency particulate control.

Spray-dryer-type absorption systems have efficiencies that are similar to those for wet-scrubber-type absorption systems. These generate a waste stream that is dry and, therefore, easier to handle than the sludge generated in a wet scrubber. However, the equipment used to atomize the alkaline slurry is complicated and can require considerably more maintenance than the wet scrubber systems. Spray-dryer-type absorption systems operate at higher gas temperatures than wet scrubbers do and are less effective for the removal of other pollutants in the gas stream such as condensable particulate matter.

The choice between a wet-scrubber absorption system and a spray-dryer absorption system depends primarily on site-specific costs. The options available for environmentally sound disposal of the waste products are also an important consideration in selecting the type of system for a specific application. Both types of systems are capable of providing high efficiency sulfur dioxide removal. Both types of systems are also very expensive to install, operate, and maintain.

Adsorption—Sulfur dioxide can also be collected by adsorption systems. In this type of control system, a dry alkaline powder is injected into the gas stream. Sulfur dioxide adsorbs to the surface of the alkaline particles and reacts to form compounds that can be precipitated out of the gas stream. Hydrated lime (calcium hydroxide) is the most commonly used alkali; however, a variety of alkalis can be used effectively. A dry-injection-type dry scrubber can be used on smaller systems as opposed to using the larger, more complicated spray-dryer-type dry scrubber. However, the dry injection system is slightly less efficient, and requires more alkali per unit of sulfur dioxide (or other acid gas) collected. Accordingly, the waste disposal requirements and costs are higher for adsorption systems than absorption systems.

In general, the prior art adsorption methods are more expensive because they require expensive equipment, including a bag house and electrostatic precipitator, are inefficient in the utilization of alkali and reduction of sulfur, and require extra maintenance because the injectors are prone to plugging.

Thus, prior art $SO_2$ absorption and adsorption systems and methods have drawbacks that make them expensive and/or inefficient. A need exists, therefore, for a $SO_2$-removal system and method that produces an easily-handled by-product, achieves greater than 70% sulfur removal from the flue gas with high sorbent utilization, and reduces the equipment requirements (and costs).

Furnace Sorbent Injection (FSI) to Reduce SOx

Other pollutants, such as $SO_3$, Hg, HCl, NOx, and PM have also been removed from combustion effluent by furnace sorbent injection (FSI). However, the prior art methods for the removal of these pollutants are also relatively inefficient and expensive to perform.

ROFA

Rotating opposed-fired air (ROFA) utilizes the co-ordinated, reinforcing, tangential injection of high-velocity secondary air to produce turbulent mixing, resulting in a greater combustion efficiency for greater NOx reduction, such as taught in U.S. Pat. No. 5,809,910 issued Sep. 22, 1998 to Svendssen, which describes a ROFA system that provides for the asymmetrical injection of overfired air (OFA) in order to create a rotation and high turbulence in the furnace, thus more thoroughly mixing the secondary air and the combustion gases. ROFA has been applied to combustion furnaces solely for the reduction of NOx and $SO_3$ in the prior art.

Overall, while the use of boosted over fire air is known in the art, its use in combination with fuel sorbent injection for efficient, cost-effective, and highly effective reduction of pollutants has not been taught or disclosed in the prior art. Thus, a need exists for systems and methods providing for the reduction of pollutants in flue gas concentration in a combustion process burning sulfurous fossil fuel and utilizing a high-turbulence over fired air system.

SUMMARY OF THE INVENTION

The present invention is directed towards systems and methods for the reduction of pollutants, including but not limited to $SO_2$, $SO_3$, Hg, HCl, NOx, PM, and equivalents, and combinations thereof, in flue gas concentration in a combustion process burning sulfurous fossil fuel and utilizing a high-turbulence over fired air system. Specifically, the increased velocity and turbulence in the upper furnace from ROFA, combined with FSI, greatly increases the reaction and stability of the FSI system in the upper furnace. Not only are the benefits of FSI augmented, but so are the benefits of ROFA. This synergistic, combined effect is the purpose of the invention.

It is one aspect of the present invention to provide systems and methods for reducing pollutant flue gas concentration in a combustion process utilizing a sulfurous fuel, including the steps of:

providing a staged combustion system for application in a reactor, the staged combustion system having asymmetrical injection devices for introducing at least one sorbent to the reactor by asymmetrical injection at predetermined, spaced apart locations;

injecting the fuel with a primary air through a first stage prior to injection of a secondary air;

injecting the secondary air and at least one sorbent through the plurality of injection devices; and controlling the asymmetrical injection of the secondary air to produce a turbulence resulting in dispersion of the at least one chemical agent into the reaction system, thereby providing increased reaction and reactor efficiency and reduced pollutants in the reaction process;

wherein the staged combustion system includes ROFA and FSI in combination for providing increased reactivity within a predetermined zone of the reactor, thereby producing more complete, more effective, and more efficient reduction of pollutants therein.

It is another aspect of the present invention to provide systems and methods for reducing pollutants in effluents within combustion systems using ROFA and FSI combinations wherein the ROFA and FSI are provided: at spaced apart locations with the ROFA being upstream of the FSI, co-axially, and combinations thereof.

These and other aspects of the present invention will become apparent to those skilled in the art after a reading of the following description of preferred embodiment(s) when considered with the drawings.

BRIEF DESCRIPTION OF THE DRAWINGS

FIG. 2 is a schematic drawing of another system according to the present invention.

DETAILED DESCRIPTION OF THE INVENTION

Figure 1:
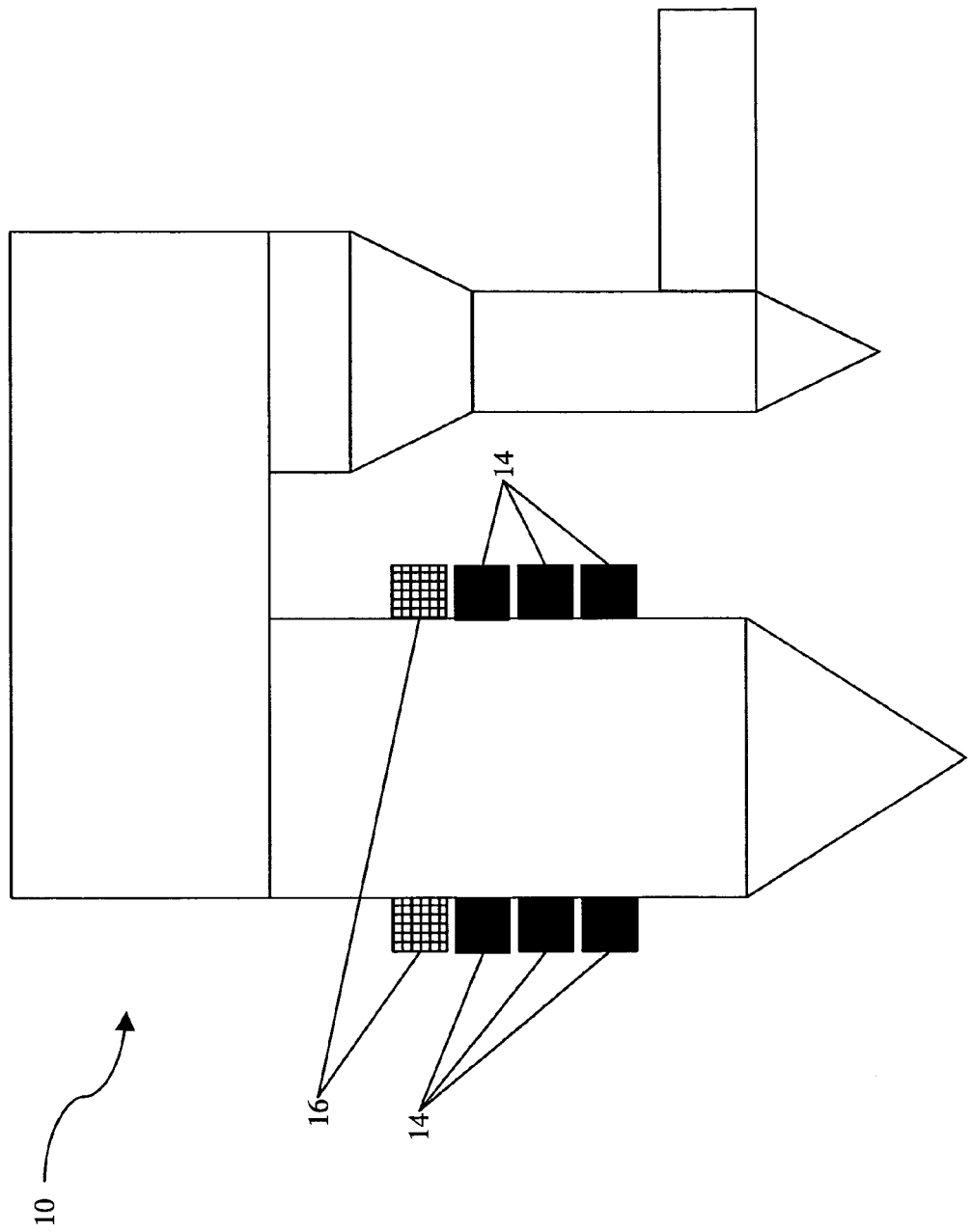
FIG. 1 is a schematic drawing of a system according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. In the present invention, "reducible acid" refers to acids in which the acidity can be reduced or eliminated by the electrochemical reduction of the acid. In this description of the embodiment, the term "duct" is used to describe a reagent injection passageway without any constriction on the end. The term "injector" is used to describe a reagent injection passageway with a constrictive orifice on the end. The orifice can be a hole or a nozzle. An injection device is a device that incorporates ducts or injectors or both.

As they relate to the present invention, the following terms are used herein as defined by the following. Combustion staging is being defined as the process of burning a fuel, i.e., coal, in two or more stages. A fuel-rich stage, or simply, rich stage, is one in which not enough air is available to fully burn the fuel. A fuel-lean stage is one in which there is sufficient or extra air to fully burn the fuel. Staging is used in the prior art to reduce NOx by a) reducing peak temperatures (thermal NOx) and b) providing a reducing environment (NOx reduction). Macro-staging is the dividing of whole sections of a furnace into rich and lean stages and is accomplished through the use of such techniques as Over-Fired Air (OFA). Micro-staging is the creation of proximal microenvironments with functionally different characteristics, such as reduction potential, temperature, and the like. Micro-staging in a furnace can be achieved, for example, in the first stage of the furnace through the use of Low-NOx Burners (LNB) with adjustment of spin-vane settings and registers. Increased staging increases the residence time in a reducing atmosphere and increases the effect of the reducing atmosphere.

Macro-staging is used to reduce emissions in combustion furnaces. Macro-staging consists of highly mixed fuel and air in the lower furnace, mixed to a stoichiometric ratio below unity for a large part of the flow. Excess oxygen is ultimately required to assure that all of the fuel has burned and to reduce explosion risks. In a macro-staged furnace, excess air is introduced downstream of the burners. Increased staging is achieved by increasing the residence time, temperature, or reducing-potential of the combustion products in the absence of oxygen.

Either/both micro-staging (LNB) and macro-staging (OFA) may be used to reduce NOx emissions in combustion furnaces. In the case of both micro-staging and macro-staging, components of each of the above are used and adjusted to achieve NOx emissions reduction.

High turbulence ROFA is used to reduce the reactor space required for burn-out, thereby freeing more reactor space from the rich stage and thereby increase the residence time and/or reducing potential in the rich stage.

High-turbulence ROFA air is understood to travel across the column of combustion gases and is deflected by the opposing wall. This forceful injection induces turbulent mixing in at least three ways: (1) by the generation of swirl in the gas column, (2) the generation of turbulence in proximity of the opposing wall after deflection of the advected air by the wall, and (3) by the turbulence caused by the rotation of the column of combustion gases in a non-circular furnace.

Increased turbulence afforded by high-velocity over-fired air systems like ROFA results in far better burnout of incomplete combustion products produced in the fuel-rich macro-staging lower in the furnace, i.e., the increased velocity and turbulence in the upper furnace from ROFA greatly increases the reaction and combustion stability in the upper furnace.

Method of Reducing SOx in Combustion Furnace

The present invention advantageously uses ROFA in combination with FSI to reduce pollutants, including but not limited to the gas $SO_2$, $SO_3$, Hg, HCl, NOx, PM, and equivalents and combinations thereof, emissions in a combustion furnace. The ROFA and FSI combination according to the present invention provides a vigorous mixing of the combustion space, resulting in greater reaction efficiencies for the injected sorbent or sorbents and greater removal of the noxious species.

According to embodiments of the present invention, the ROFA is constructed, configured, and implemented upstream of the FSI injection (upstream ROFA) and also simultaneously with the FSI (co-injected ROFA). In the first case according to the systems and methods of the present invention, the upstream ROFA induces mixing that then turbulently interacts with the FSI. With co-injected ROFA/FSI, the simultaneous, proximal injection of ROFA and FSI enhances the dispersion and mixing of the at least one sorbent into the combustion gases. The mixing provided by the systems and methods of the present invention provides for sorbent injection that is more efficient, effective, and complete than prior art systems and methods using either furnace sorbent injection (FSI) alone or ROFA alone to achieve better burn out and pollutant reduction.

The present invention provides for systems and methods wherein a furnace sorbent injection is combined with a ROFA system upstream rotation and high turbulence. Surprisingly, the systems and methods of the present invention combining ROFA with FSI as set forth herein produce synergistic effects greater than either ROFA or FSI separately and also greater than what may have been predicted for combining them. Also, surprisingly, the combined ROFA and FSI according to the systems and methods of the present invention provide for pollutant reduction across a greater range of chemical species, i.e., not just for reducing SOx, but also Hg, HCl, NOx, PM, and equivalents and combinations thereof. Based upon extensive experimentation (independently verified), the systems and methods of the present invention were understood to produce significantly greater reduction of pollutants due to the synergistic effect of mixing, fluid dynamics, and turbulence of ROFA to produce surprising chemical effects. The chemical effects were proven to result from improved chemical reaction and more advantageous chemistry in the zone of the furnace where reduction of pollutants is desired to occur, i.e., more complete and more effective reactions resulting in more reduction of pollutants and more utilization of injected chemicals than with either simple mixing or injection of reagents as in the prior art, due to both an increase in the overall mixing area wherein the chemical reactions occur, but also, significantly, more effective reactions within the same area. Thus, surprisingly, the systems and methods of the present invention as set forth herein provide for even better than expected reduction within the same area, as well as improved reduction over a larger area, all of which result in improved reactions for reduction of pollutants. Thus, the present invention provides not merely increased area of application for reaction for reduction of pollutants, but also more effective mixing within a given area that provides for surprising results in improved chemistry within any given space or area of the combustion unit. Therefore, synergies are created by improved mixing, component availability, and component reactions within a given time and temperature based upon the combinations of upstream ROFA and FSI according to the present invention.

Referring now to the drawings in general, the illustrations are for the purpose of describing a preferred embodiment of the invention and are not intended to limit the invention thereto.

Upstream ROFA

In this embodiment, the ROFA is injected prior to the FSI injection, the UPSTREAM ROFA inducing the mixing of the at least one sorbent when it is injected later. The ROFA system includes a series of secondary air introduction ducts with nozzles advecting the secondary air into a moving column of combustion gases, wherein the ducts are positioned in a predetermined, spaced-apart manner to create rotational flow of the combustion zone, as described in U.S. Pat. No. 5,809,910, incorporated herein by reference in its entirety. The reagent injection ducts are preferably arranged to act at mutually separate levels or stages on the mutually opposing walls of the reactor. Additionally, the ducts may further include nozzles, which are preferably positioned at distances along the axis of flow of the furnace away from the furnace that result in the rotation being maintained by the co-ordinated, reinforcing, tangential injection of high-velocity secondary air into the combustion gas column. This system provides a vigorous mixing of the combustion space, resulting in greater combustion and reaction efficiencies.

Similarly, the vigorous mixing in the combustion area produced by the present invention also prevents the laminar flow and consequential lower residence time of higher inertia sorbent particles in the reactor, thereby allowing them more time to react in the reactor and further increasing the reaction efficiency.

Furnace Sorbent Injection—FSI

The FSI can be achieved with a variety of methods and devices known in the prior art.

Sorbent Properties

The sorbents are selected based on their chemical and physical properties to maximize their utilization and the reduction of SO2.

Chemical Properties

The sorbent types used include alkali that convert the SO2 to an inorganic salt to prevent the sulfur from being emitted into the environment. The alkali for the reaction most frequently used include: limestone—either calcitic or dolomitic; quick and hydrated lime—slurry or dry; and magnesium hydroxide—commercial and byproduct from Thiosorbic lime; and trona.

Particulate Size/Shape Distribution

The sorbent particulate have size and shape characteristics that increase reaction efficiency, provide increased catalytic surface for NOx reactions, produce microturbulence, and result in their complete consumption prior to exiting the furnace and/or impinging on furnace surfaces such as catalysts, heat exchangers, and the like.

Surface Area, Surface Shape

The particles sizes are those currently used in standard FSI injections. For example, the particle sizes can range from about 5 microns to about 100 microns. Alternatively, a majority of the particles are desired to pass through 325 mesh, which limits the diameter to 35.6 microns. The fine particles provide more surface area per unit mass and therefore favor surface reactions over larger particles.

Momentum/Inertia Factors

The vigorous mixing in the combustion area produced by the present invention also prevents the laminar flow and consequential lower residence time of higher inertia sorbent particles in the reactor, thereby allowing them more time to react in the reactor and further increasing the reaction efficiency.

Turbulence and Low-concentration Species, Including Hg

The high-turbulence generated by the ROFA system produced surprising results regarding the low concentration species, such as Hg, HCl, and even SO2, SO3, NOx, and PM, and equivalents and combinations thereof, where the pollutants have been reduced and/or are in low concentrations but where further reduction is desired. As shown in Table 1, concentrations of these pollutants are reduced even further than expected with the systems and methods of the present invention. In the system equipped with upstream ROFA and co-injected ROFA, as shown in FIG. 1, the increased mixing provided by the ROFA systems increased the probability of sorbent contacting Hg and the other low concentration species, resulting in reaction of these low concentration species with the sorbent, and in higher utilization of the sorbent. Because the efficiency of reaction is increased, special sorbents targeted at low-concentration species can now be used efficiently and effectively to remove these species from the flue gas or otherwise render them innocuous.

TABLE 1

FSI with ROFA Pollutant Reduction Percentage Test Results

| Pollutant % Reduction | Limestone Injection | Trona Injection |
|---|---|---|
| SO2 | 64% | 69% |
| SO3 | 90% | 90% |
| HCL | 0% | 75% |
| Mercury | 89% | 67% |
| NOx | 4% | 11% |
| PM | 18% | 80% |

Co-Injected ROFA/FSI

The ROFA and FSI injections can be performed simultaneously in the approximate same location, herein described as co-injected ROFA/FSI. This proximal, simultaneous injection of ROFA and FSI enhances the dispersion and mixing of the sorbent.

Thus, in another embodiment, the combustion system includes a series of ROFA ducts in the proximity of FSI nozzles advecting the at least one sorbent into a moving column of combustion gases, wherein the ROFA ducts are positioned in a predetermined, spaced-apart manner to create rotational flow of the combustion zone, as described in U.S. Pat. No. 5,809,910, incorporated herein by reference in its entirety. The reagent injection ducts are preferably arranged to act at mutually separate levels or stages on the mutually opposing walls of the reactor. However, other configurations are possible that achieve adequate mixing, as described in co-pending U.S. application Ser. No. 1340-005 10/461,735 confirmed filing date Jun. 13, 2003, incorporated herein by reference in its entirety.

The ducts are preferably positioned at distances along the axis of flow of the furnace away from the furnace that result in the rotation being maintained by the co-ordinated, reinforcing, tangential injection of high-velocity secondary air into the combustion gas column. This system provides a vigorous mixing of the combustion space, resulting in greater sorbent reaction efficiencies.

In a preferred embodiment, shown in FIG. 1, a combustion furnace, generally described as 10, is equipped with a series of ROFA ducts 14 that inject high-velocity air into the furnace and sorbent injectors 16 that inject sorbent downstream from the ROFA ducts. The ROFA ducts produce high-turbulence, resulting in increased dispersion and mixing of the injected sorbent.

According to the systems and methods of the present invention, one embodiment provides for reducing pollutant flue gas concentration in a combustion process utilizing a sulfurous fuel, including the steps of:

providing a staged combustion system for application in a reactor, the staged combustion system having asymmetrical injection devices for introducing at least one sorbent to the reactor by asymmetrical injection at predetermined, spaced apart locations; injecting the fuel with a primary air through a first stage prior to injection of a secondary air; injecting the secondary air and at least one sorbent through the plurality of injection devices; and controlling the asymmetrical injection of the secondary air to produce a turbulence resulting in dispersion of the at least one chemical agent into the reaction system, thereby providing increased reaction and reactor efficiency and reduced $SO_2$ in the reaction process; wherein the staged combustion system includes ROFA and FSI in combination for providing increased reactivity within a predetermined zone of the reactor, thereby producing more complete, more effective, and more efficient reduction of pollutants therein.

In various alternative preferred embodiments, the selection and application of which depends upon the configuration of the combustion furnace or reactor, temperature, fuel, and various other factors, the FSI stage and the ROFA stage are separate, such as ROFA being upstream from the FSI stage, co-injected, either co-axially co-injected or otherwise, and combinations thereof.

Co-axial Injection Device

ROFA/FSI co-axial injection device for sorbent injection is set forth in a preferred embodiment, as described in U.S. patent application Ser. No. 1340-005 10/461,735 confirmed filing date Jun. 13, 2003 incorporated herein by reference in its entirety, can disperse heterogenously-sized particle populations that would plug a conventional atomizing nozzle. This capability reduces the requirement for highly-controlled particle size populations and allows the use of larger-sized particles, thus reducing sorbent expenses.

The present invention also eliminates the need for atomization nozzles to disperse the at least one sorbent and also eliminates the need for wet-scrubber apparatus. The use of larger-sized particles also takes advantage of the greater momentum of these particles to create microswirls in the combustion gases. These microswirls enhance mixing, thus favoring reactions in the combustion space.

Thus, in a preferred embodiment, shown in FIG. 2, a combustion furnace is equipped with a series of ROFA ducts 14 that inject high-velocity air into the furnace and co-axial ROFA sorbent injectors 18. The upstream and coaxial ROFA ducts produce high-turbulence, resulting in increased dispersion and mixing of the injected sorbent.

Cooling Water

The present invention can also include the injection of other materials to affect the physical and chemical properties of the combustion space, and thereby the reactions. For example, water can be injected into the combustion space, as described in U.S. application Ser. No. 10/757,056 filed Jan. 14, 2004 1340-007, incorporated herein by reference in its entirety. This water simultaneously cools the combustion space, thereby allowing control of the sorbent reaction space, and also provides more density to the injected air and materials, thereby providing better mixing.

Method of Reducing SOx and NOx in Combustion Furnace

Injection of a sorbent into a ROFA-equipped combustion burner produced a reduction in SO2, but also, surprisingly, an additional reduction in NOx versus the ROFA-alone system. This surprising and unexpected reduction in NOx, due to the catalytic surface provided by the sorbent particles, was maximized in the tests.

Thus, the mixing provided by ROFA and FSI combinations as set forth herein increases the probability of encounter for all chemical species, resulting in greater efficiency of reaction for relatively high concentration species, such as SO2, and especially for low concentration species, such as Hg, and also results in better utilization of the sorbent. It is noted that other pollutant species are also reacted more efficiently, effectively and completely, including but not limited to $SO_2$, $SO_3$, Hg, HCl, NOx, PM, and equivalents, and combinations thereof.

EXAMPLES

The following example illustrates the results that can be achieved using methods according to the present invention, but are not intended to limit the invention thereto.

Methods according to the present invention were used to control SO2, as shown in the following:

Furnace sorbent injection (FSI) using limestone and trona was examined in combination with ROFA on a 154 MW unit at a power generation facilty to examine sustainable pollutant reduction while combining both ROFA and FSI together.

The surprising results of the test are summarized in Table 1, as set forth hereinabove.

TABLE 1

FSI with ROFA Pollutant Reduction Percentage Test Results

| Pollutant % Reduction | Limestone Injection | Trona Injection |
|---|---|---|
| SO2 | 64% | 69% |
| SO3 | 90% | 90% |
| HCL | 0% | 75% |
| Mercury | 89% | 67% |
| NOx | 4% | 11% |
| PM | 18% | 80% |

Trona injection provided better SO2, HCl, NOx, and particulate matter (PM) reduction, while limestone provided better mercury (Hg) reduction. Both chemicals provided the same SO3 reduction.

This study was undertaken because of the potential of ROFA and FSI together to reduce SO2, Hg, and HCl air emissions on a low cost per kilowatt basis. The primary advantages of FSI relative to other FGD systems are the simplicity of the process and a low capital cost.

Past FSI demonstrations have produced SO2 reductions from 25-50%. When combined with ROFA, FSI produced 65% SO2 reduction at the 154 MW unit and 90% SO2 reduction at a 78 MW coal-fired unit in Sweden owned by Danisco Sugar.

Trona and limestone were chosen for injection. In the furnace, the sorbent first undergoes calcination to form highly reactive oxides that readily react with the SO2 in the combustion gas. Depending on the injected sorbent the reaction produces either sodium or calcium sulfate which is picked up by particulate control devices. The "popcorn-like" decomposition or calcination of the sorbent creates a large and reactive surface by bringing unreacted sodium or calcium carbonate to the particle surface for Hg, HCl, and SO2 neutralization. Trona was supplied by Solvay Minerals and limestone was supplied by Chemical Lime.

The activation, and thus chemical reactivity, of the trona and limestone was accelerated by the rapid mixing between the Rotamix injection air and turbulent combustion products in the furnace downstream of the ROFA ports.

The sorbent injection trials were conducted on a unit of a power generation facility in the U.S. The unit conditions were as follows:
 CE four corner fired unit
 154 MWe generating capacity at gross
 Four levels of burners built in 1957
 No OFA or FGR systems installed previously
 No burner modifications Test data was collected manually and by a distributed control system. The test program for analysis included the following:
 Coal composition
 Sorbent particle size
 ESP: Mercury, (elemental & speciated), HCL, SO3/SO2
 Control room CEM data: NOx, SO2, O2, CO, CO2, opacity The sorbent sizes were as shown in Table 2:

TABLE 2

Sorbent Particle Size (pass through)

| Limestone | 92% less than 74 microns |
| Limestone | 80% less than 44 microns |
| Trona | 75% less than 70 microns |
| Trona | 50% less than 28 microns |
| Trona | 10% less than 6 microns |

The following data show the raw data from the testing and demonstrates the reduction as a function of molar ratio and also the speciation of the mercury reduction.

| Condition | | Baseline | | | Limestone | | |
|---|---|---|---|---|---|---|---|
| Run | | 1 | 2 | Avg | 1 | 2 | Avg |
| Date | | Nov. 12, 2002 | Nov. 12, 2002 | | Dec. 10, 2002 | Dec. 10, 2002 | |
| Start Time | | 10:10 | 14:02 | | 12:29 | 16:20 | |
| End Time | | 12:19 | 16:10 | | 14:43 | 18:32 | |
| Flow (ESP Inlet) | dscfm | 282,609 | 322,967 | 302,788 | 256,095 | 262,486 | 259,291 |
| | °F. | 243 | 243 | 243 | 246 | 245 | 245 |
| $O_2$ (ESP Inlet)** | % dry | 4.3 | 4.3 | 4.3 | 5.5 | 5.4 | 5.4 |
| $H_2O$ (ESP Inlet) | % vol | 8.0 | 7.5 | 7.8 | 5.3 | 6.3 | 5.8 |
| HCl (ESP Inlet) | ppmvd | 64.8 | 67.5 | 66.2 | 53.3 | 62.8 | 58.1 |
| | lb/MMBtu | 0.13 | 0.14 | 0.14 | 0.12 | 0.14 | 0.13 |
| | lb/hr | 104.2 | 124.0 | 114.1 | 77.7 | 93.7 | 85.7 |

-continued

| | | | | | | | |
|---|---|---|---|---|---|---|---|
| PM (ESP Inlet) | gr/dscf | 5.01 | 4.84 | 4.92 | 3.95 | 4.12 | 4.03 |
| | lb/MMBtu | 8.8 | 8.5 | 8.7 | 7.5 | 7.8 | 7.6 |
| | lb/hr | 12,127 | 13,392 | 12,760 | 8,660 | 9,280 | 8,970 |
| Flow (Stack) | dscfm | 271,890 | 237,852 | 254.871 | 234,814 | 234,010 | 234,412 |
| | °F. | 246 | 245 | 245 | 274 | 287 | 261 |
| $O_2$ (Stack) | % dry | 7.5 | 6.5 | 7.0 | 9.3 | 10.5 | 9.9 |
| $H_2O$ (Stack) | % vol | 8.5 | 7.7 | 8.1 | 6.7 | 7.1 | 6.9 |
| $SO_2$ (Stack) | ppmvd | 729.9 | 706.2 | 718.1 | 324.3 | 356.0 | 340.2 |
| | lb/MMBtu | 1.9 | 1.7 | 1.8 | 0.9 | 1.2 | 1.1 |
| | lb/hr | 2742 | 1675 | 2208 | 759 | 831 | 795.1 |
| $SO_3$ (Stack) | ppmvd | 0.47 | 0.54 | 0.51 | 0.06 | 0.06 | 0.06 |
| | lb/MMBtu | 0.0015 | 0.0016 | 0.0015 | 0.0002 | 0.0003 | 0.0002 |
| | lb/hr | 0.0042 | 0.0047 | 0.0044 | 0.0006 | 0.0006 | 0.0006 |
| $Hg^{PM}$ (Stack) | $ug/Nm^3$ | 0.10 | 0.01 | 0.05 | 0.18 | 0.01 | 0.09 |
| | lb/MMBtu | 8.6E−08 | 6.6E−09 | 4.6E−08 | 1.8E−07 | 8.2E−09 | 9.6E−08 |
| | lb/hr | 9.2E−05 | 6.6E−06 | 4.9E−05 | 0.00015 | 5.8E−06 | 7.7E−05 |
| $Hg^{+2}$ (Stack) | $ug/Nm^3$ | 7.95 | 8.16 | 8.06 | 0.90 | 1.04 | 0.97 |
| | lb/MMBtu | 7.1E−06 | 6.7E−06 | 6.9E−06 | 9.2E−07 | 1.2E−06 | 1.1E−06 |
| | lb/hr | 0.0075 | 0.0068 | 0.0072 | 0.0007 | 0.0009 | 0.0008 |
| $Hg^O$ (Stack) | $ug/Nm^3$ | 2.50 | 3.14 | 2.82 | 0.09 | 0.07 | 0.08 |
| | lb/MMBtu | 2.2E−06 | 2.6E−06 | 2.4E−06 | 9.2E−08 | 8.5E−08 | 8.9E−08 |
| | lb/hr | 0.0024 | 0.0026 | 0.0025 | 0.0001 | 0.0001 | 0.0001 |
| $Hg^{Total}$ (Stack) | $ug/Nm^3$ | 10.54 | 11.31 | 10.93 | 1.18 | 1.12 | 1.15 |
| | lb/MMBtu | 9.4E−06 | 9.3E−06 | 9.3E−06 | 1.2E−06 | 1.3E−06 | 1.2E−06 |
| | lb/hr | 0.0100 | 0.0094 | | 0.0097 | 0.0010 | 0.0009 | 0.0009 |
| PM (Stack) | gr/dscf | | | #DIV/0! | | | #DIV/0! |
| | lb/MMBtu | | | #DIV/0! | | | #DIV/0! |
| | lb/hr | | | #DIV/0! | | | #DIV/0! |

| | | Condition | Limestone | Trona | | | |
|---|---|---|---|---|---|---|---|
| | | Run | % Red* | 1 | 2 | Avg | % Red* |
| | | Date | | Dec. 13, 2002 | Dec. 13, 2002 | | |
| | | Start Time | | 9:45 | 14:10 | | |
| | | End Time | | 12:01 | 16:22 | | |
| | Flow (ESP Inlet) | dscfm | | 243,832 | 224,469 | 234,150 | |
| | | °F. | | 262 | 271 | 267 | |
| | $O_2$ (ESP Inlet)** | % dry | | 4.6 | 3.9 | 4.3 | |
| | $H_2O$ (ESP Inlet) | % vol | | 6.6 | 7.4 | 7.0 | |
| | HCl (ESP Inlet) | ppmvd | 12.3% | 16.1 | 12.4 | 14.3 | 78.4% |
| | | lb/MMBtu | 5.8% | 0.03 | 0.02 | 0.03 | 78.4% |
| | | lb/hr | 24.9% | 22.3 | 15.9 | 19.1 | 83.3% |
| | PM (ESP Inlet) | gr/dscf | 18.0% | 1.23 | 0.75 | 0.99 | 79.9% |
| | | lb/MMBtu | 11.9% | 2.2 | 1.3 | 1.7 | 79.8% |
| | | lb/hr | 29.7% | 2,577 | 1,441 | 2,009 | 84.3% |
| | Flow (Stack) | dscfm | | 234,860 | 229,637 | 232,248 | |
| | | °F. | | 248 | 261 | 254 | |
| | $O_2$ (Stack) | % dry | | 8.0 | 6.3 | 7.1 | |
| | $H_2O$ (Stack) | % vol | | 6.5 | 7.1 | 6.8 | |
| | $SO_2$ (Stack) | ppmvd | 52.6% | 296.1 | 291.0 | 293.5 | 59.1% |
| | | lb/MMBtu | 40.0% | 0.8 | 0.7 | 0.7 | 58.6% |
| | | lb/hr | 64.0% | 694 | 666 | 679.9 | 69.2% |
| | $SO_3$ (Stack) | ppmvd | 87.5% | 0.04 | 0.03 | 0.03 | 93.1% |
| | | lb/MMBtu | 84.2% | 0.0001 | 0.0001 | 0.0001 | 93.0% |
| | | lb/hr | 86.9% | 0.0003 | 0.0003 | 0.0003 | 93.0% |
| | $Hg^{PM}$ (Stack) | $ug/Nm^3$ | −79.1% | 0.04 | 0.11 | 0.08 | −52.1% |
| | | lb/MMBtu | −108.1% | 4.1E−08 | 9.3E−08 | 6.7E−08 | −45.2% |
| | | lb/hr | −56.2% | 3.7E−05 | 9.2E−05 | 6.4E−05 | −30.5% |
| | $Hg^{+2}$ (Stack) | $ug/Nm^3$ | 87.9% | 2.07 | 2.15 | 2.11 | 73.8% |
| | | lb/MMBtu | 84.7% | 1.9E−06 | 1.7E−06 | 1.8E−06 | 73.5% |
| | | lb/hr | 88.9% | 0.0017 | 0.0017 | 0.0017 | 76.1% |
| | $Hg^O$ (Stack) | $ug/Nm^3$ | 97.1% | 1.54 | 1.28 | 1.41 | 50.1% |
| | | lb/MMBtu | 96.3% | 1.4E−06 | 1.0E−06 | 1.2E−06 | 49.0% |
| | | lb/hr | 97.3% | 0.0013 | 0.0010 | 0.0011 | 54.2% |
| | $Hg^{Total}$ (Stack) | $ug/Nm^3$ | 89.5% | 3.65 | 3.54 | 3.60 | 67.1% |
| | | lb/MMBtu | 86.7% | 3.4E−06 | 2.9E−06 | 3.1E−06 | 66.6% |
| | | lb/hr | 90.3% | 0.0030 | 0.0028 | 0.0029 | 69.9% |
| | PM (Stack) | gr/dscf | #DIV/0! | | | #DIV/0! | #DIV/0! |
| | | lb/MMBtu | #DIV/0! | | | #DIV/0! | #DIV/0! |
| | | lb/hr | #DIV/0! | | | #DIV/0! | #DIV/0! |

*% reduction based on average values during sorbent injection tests compared to average values during baseline tests.
**ESP Inlet $O_2$ readings collected by URS appear to contain ambient air dilution. Values shown based on plant instrumentation at air heater (wet basis) for Limestone and Trona tests. Baseline value assumed equal to Trona value.
***lb/MMBtu based on EPA Method 19 Fd factor of 9780 dscf/MMBtu Certain modifications and improvements will occur to those skilled in the art upon a reading of the foregoing description. All modifications and improvements have been deleted herein for the sake of conciseness and readability but are properly within the scope of the following claims.

What is claimed is:

1. A method of reducing $SO_2$ flue gas concentration in a combustion process utilizing a sulfurous fuel, comprising the steps of:
   providing a staged combustion system for application in a reactor, the staged combustion system having asymmetrical injection devices for introducing at least one sorbent to the reactor by asymmetrical injection at predetermined, spaced apart locations;
   injecting the fuel with a primary air through a first stage prior to injection of a secondary air;
   injecting the secondary air and at least one sorbent through the injection devices; and
   controlling the asymmetrical injection of the secondary air to produce a turbulence resulting in dispersion of the sorbent into the reaction system, thereby providing increased reaction and reactor efficiency and reduced $SO_2$.

2. The method of claim 1, wherein the staged combustion system includes at least two stages.

3. The method of claim 1, wherein the staged combustion system includes at least three stages.

4. The method of claim 1, wherein the staged combustion system includes at least one ROFA stage, and at least one FSI stage.

5. The method of claim 4, wherein the staged combustion system includes a primary stage, at least one ROFA stage, and at least one FSI stage.

6. The method of claim 4, wherein the FSI stage and the ROFA stage are co-injected.

7. The method of claim 4, wherein the FSI stage and the ROFA stage are separate.

8. The method of claim 4, wherein the ROFA stage is upstream from the FSI stage.

9. The method of claim 6, wherein the FSI stage and the ROFA stage are injected co-axially.

10. A method for reducing pollutant formation, comprising the steps of:
    providing a staged combustion system including at least one FSI stage, and a furnace with asymmetrical injection ports introducing at least one sorbent to the furnace by asymmetrical injection at predetermined, spaced apart locations;
    injecting the fuel with a primary air through a first stage prior to injection of a secondary air;
    injecting secondary air and at least one sorbent through the injection ducts; and
    controlling the asymmetrical injection of secondary air to produce a turbulence resulting in dispersion of the sorbent into the furnace, thereby providing increased reaction and reactor efficiency and reduced NOx formation.

11. The method of claim 10, wherein lime is injected to reduce NOx.

12. The method of claim 10, wherein lime is injected to reduce Hg.

13. The method of claim 10, wherein the staged combustion system includes at least two stages.

14. The method of claim 10, wherein the staged combustion system includes at least three stages.

15. The method of claim 10, wherein the staged combustion system includes at least one ROFA stage, and at least one FSI stage.

16. The method of claim 15, wherein the staged combustion system includes a primary stage, at least one ROFA stage, and at least one FSI stage.

17. The method of claim 15, wherein the FSI stage and the ROFA stage are co-injected.

18. The method of claim 15, wherein the FSI stage and the ROFA stage are separate.

19. The method of claim 15, wherein the ROFA stage is upstream from the FSI stage.

20. The method of claim 15, wherein the FSI stage and the ROFA stage are injected co-axially.

21. A method of reducing pollutant flue gas concentration in a combustion process utilizing a sulfurous fuel, comprising the steps of:
    providing a staged combustion system for application in a reactor, the staged combustion system having asymmetrical injection devices for introducing at least one sorbent to the reactor by asymmetrical injection at predetermined, spaced apart locations;
    injecting the fuel with a primary air through a first stage prior to injection of a secondary air;
    injecting the secondary air and at least one sorbent through the injection devices; and
    controlling the asymmetrical injection of the secondary air to produce a turbulence resulting in dispersion of the sorbent into the reaction system, thereby providing increased reaction and reactor efficiency and reduced $SO_2$;
    wherein the staged combustion system includes ROFA and FSI in combination for providing increased reactivity within a predetermined zone of the reactor, thereby producing more complete, more effective, and more efficient reduction of pollutants therein.

22. The method of claim 21, wherein the FSI stage and the ROFA stage are co-injected.

23. The method of claim 21, wherein the FSI stage and the ROFA stage are separate.

24. The method of claim 21, wherein the ROFA stage is upstream from the FSI stage.

25. The method of claim 21, wherein the FSI stage and the ROFA stage are provided co-axially.

* * * * *